(12) United States Patent
Hayner et al.

(10) Patent No.: US 10,084,410 B2
(45) Date of Patent: Sep. 25, 2018

(54) MOVING MAGNET MOTOR AND TRANSDUCER WITH MOVING MAGNET MOTOR

(71) Applicant: Bose Corporation, Framingham, MA (US)

(72) Inventors: Mark A. Hayner, Belmont, MA (US); Robert Preston Parker, Westborough, MA (US); Benjamin Peterson, West Boylston, MA (US); Joseph Maurer, San Jose, CA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/379,874

(22) Filed: Dec. 15, 2016

(65) Prior Publication Data

US 2018/0175781 A1    Jun. 21, 2018

(51) Int. Cl.

| | |
|---|---|
| *H04R 9/02* | (2006.01) |
| *H02P 31/00* | (2006.01) |
| *H02K 1/14* | (2006.01) |
| *H02K 1/16* | (2006.01) |
| *H02K 1/27* | (2006.01) |
| *H02K 3/12* | (2006.01) |
| *H02K 16/04* | (2006.01) |
| *H02K 7/14* | (2006.01) |

(52) U.S. Cl.
CPC ............ *H02P 31/00* (2013.01); *H02K 1/141* (2013.01); *H02K 1/16* (2013.01); *H02K 1/27* (2013.01); *H02K 3/12* (2013.01); *H02K 7/14* (2013.01); *H02K 16/04* (2013.01)

(58) Field of Classification Search
CPC .......... H04R 11/02; H04R 9/025; H04R 9/06; H04R 9/063; H04R 1/00; H04R 2499/15; H04R 2209/022; H04R 2400/07; H04R 9/027; H04R 9/04; H04R 1/02; H04R 1/42; H04R 2209/021; H04R 2440/01; H04R 2499/13
See application file for complete search history.

(56) References Cited

U.S. PATENT DOCUMENTS 4,590,333 A * 5/1986 Strohbeen ................ H04R 1/24
                                                181/144
4,703,297 A * 10/1987 Nagasaka ............ H02K 41/031
                                                335/222

(Continued)

FOREIGN PATENT DOCUMENTS

EP            0123359 A1    10/1984

*Primary Examiner* — Rina Duda
(74) *Attorney, Agent, or Firm* — Brian M. Dingman; Dingman IP Law, PC

(57) ABSTRACT

A moving magnet motor with a stator comprising first and second spaced coil-wound cores that each have a width, the cores separated by an elongated gap, and an elongated magnet located at least in part in the gap and lying generally along a motor depth axis that is in the gap and is generally uniformly offset from the cores, where the magnet has poles. The motor has a width axis that is perpendicular to the depth axis and is generally uniformly offset from the cores. The magnet has a width along the motor width axis and the cores each have a width along the motor width axis. Along the motor depth axis the ratio of the width of the magnet or a pole of the magnet to the width of a core varies.

26 Claims, 15 Drawing Sheets

(56) References Cited

U.S. PATENT DOCUMENTS

| | | | | |
|---|---|---|---|---|
| 4,860,370 A * | 8/1989 | Grosbard | | H04R 3/002 381/403 |
| 5,216,723 A * | 6/1993 | Froeschle | | H04R 3/002 381/415 |
| 5,604,815 A * | 2/1997 | Paddock | | H04R 9/025 381/182 |
| 6,067,365 A * | 5/2000 | Morenz | | H04R 9/06 381/396 |
| 6,307,287 B1 * | 10/2001 | Garrett | | F02G 1/0435 310/17 |
| 6,574,346 B1 | 6/2003 | Tanaka | | |
| 6,839,444 B2 * | 1/2005 | Ellis | | H04R 9/045 381/152 |
| 7,006,654 B2 * | 2/2006 | Stiles | | H04R 9/063 381/400 |
| 7,088,837 B2 | 8/2006 | Von Hellermann et al. | | |
| 7,201,809 B2 * | 4/2007 | Sato | | H01F 7/021 148/101 |
| 7,457,429 B2 * | 11/2008 | Stiles | | H02K 33/18 381/412 |
| 7,626,300 B2 * | 12/2009 | Sato | | H01F 1/0577 310/156.43 |
| 7,675,202 B1 * | 3/2010 | Huang | | H02K 41/0356 310/13 |
| 7,740,714 B2 * | 6/2010 | Sati | | H01F 41/028 148/103 |
| 7,813,521 B2 * | 10/2010 | Lim | | H04R 9/063 381/396 |
| 8,009,857 B2 * | 8/2011 | Bohlender | | H04R 9/06 381/400 |
| 8,039,998 B2 * | 10/2011 | Masuzawa | | H01F 1/0578 310/156.43 |
| 8,085,955 B2 | 12/2011 | Henry | | |
| 8,295,536 B2 * | 10/2012 | Carlmark | | H04R 11/02 181/161 |
| 8,295,537 B2 * | 10/2012 | Carlmark | | H04R 11/02 381/398 |
| 8,461,728 B2 * | 6/2013 | Park | | H02K 33/00 310/15 |
| 8,598,750 B2 * | 12/2013 | Park | | B06B 1/045 310/15 |
| 8,912,693 B2 * | 12/2014 | Park | | B06B 1/045 310/15 |
| 2002/0094095 A1 * | 7/2002 | Ellis | | H04R 7/045 381/152 |
| 2004/0156527 A1 * | 8/2004 | Stiles | | H04R 9/063 381/412 |
| 2004/0213430 A1 * | 10/2004 | Stiles | | H02K 33/18 381/421 |
| 2005/0031117 A1 * | 2/2005 | Browning | | H04M 1/6016 379/391 |
| 2005/0031131 A1 * | 2/2005 | Browning | | H04R 3/08 381/59 |
| 2005/0031132 A1 * | 2/2005 | Browning | | H04R 3/08 381/59 |
| 2005/0031133 A1 * | 2/2005 | Browning | | H04R 29/003 381/59 |
| 2005/0031134 A1 * | 2/2005 | Leske | | H04R 9/00 381/59 |
| 2005/0031137 A1 * | 2/2005 | Browning | | H04R 9/00 381/96 |
| 2005/0031138 A1 * | 2/2005 | Browning | | H04R 3/08 381/96 |
| 2005/0031139 A1 * | 2/2005 | Browning | | H04R 3/002 381/96 |
| 2005/0031140 A1 * | 2/2005 | Browning | | H04R 3/08 381/96 |
| 2006/0022782 A1 * | 2/2006 | Sato | | H01F 7/021 335/302 |
| 2006/0093180 A1 * | 5/2006 | Kim | | H04R 9/025 381/412 |
| 2006/0104451 A1 * | 5/2006 | Browning | | H04R 29/003 381/59 |
| 2006/0204028 A1 * | 9/2006 | Lim | | H04R 9/063 381/396 |
| 2006/0239496 A1 | 10/2006 | Stiles | | |
| 2007/0151629 A1 * | 7/2007 | Sato | | H01F 41/028 148/105 |
| 2007/0170801 A1 * | 7/2007 | Sato | | H01F 1/0577 310/156.43 |
| 2007/0171017 A1 * | 7/2007 | Sato | | H01F 7/021 335/296 |
| 2008/0199039 A1 * | 8/2008 | Bohlender | | H04R 9/06 381/412 |
| 2008/0218007 A1 * | 9/2008 | Masuzawa | | H01F 1/0578 310/44 |
| 2009/0053091 A1 * | 2/2009 | Sato | | H01F 41/028 419/66 |
| 2009/0060254 A1 * | 3/2009 | Sano | | H04R 9/025 381/412 |
| 2010/0019584 A1 * | 1/2010 | Vercelli | | H04R 9/025 310/12.16 |
| 2011/0243365 A1 * | 10/2011 | Carlmark | | H04R 11/02 381/398 |
| 2011/0243366 A1 * | 10/2011 | Carlmark | | H04R 11/02 381/398 |
| 2011/0260560 A1 * | 10/2011 | Park | | H02K 33/16 310/25 |
| 2012/0114166 A1 * | 5/2012 | Sano | | H04R 9/025 381/413 |
| 2013/0249325 A1 * | 9/2013 | Park | | H02K 33/16 310/25 |
| 2013/0272563 A1 * | 10/2013 | Boyd | | H04R 1/00 381/406 |
| 2014/0054982 A1 * | 2/2014 | Park | | B06B 1/045 310/25 |
| 2014/0270328 A1 * | 9/2014 | Lucas | | H04R 9/027 381/400 |
| 2015/0125025 A1 * | 5/2015 | Button | | H04R 9/025 381/401 |
| 2015/0172820 A1 * | 6/2015 | Hunstable | | H04R 9/02 381/401 |
| 2015/0256046 A1 * | 9/2015 | Lucas | | H02K 7/003 381/400 |
| 2015/0256911 A1 * | 9/2015 | Lucas | | H04R 1/02 381/390 |
| 2015/0256935 A1 * | 9/2015 | Lucas | | H04R 7/00 381/398 |
| 2015/0256936 A1 * | 9/2015 | Lucas | | H04R 7/00 381/398 |
| 2015/0263596 A1 * | 9/2015 | Athanas | | H04R 7/04 381/165 |
| 2015/0372580 A1 * | 12/2015 | Lucas | | H04R 9/027 381/418 |
| 2015/0381024 A9 * | 12/2015 | Athanas | | H04R 7/04 381/165 |

* cited by examiner

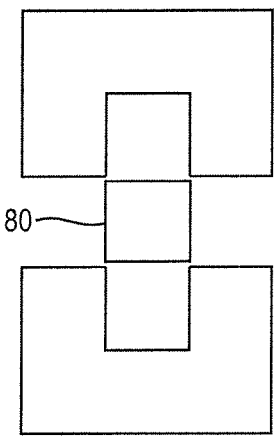
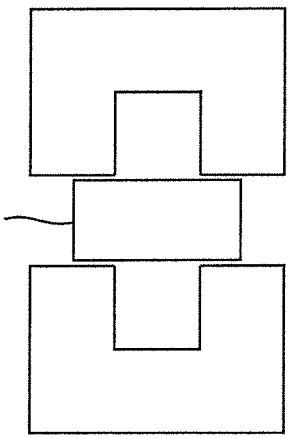
FIG. 6A  FIG. 6B
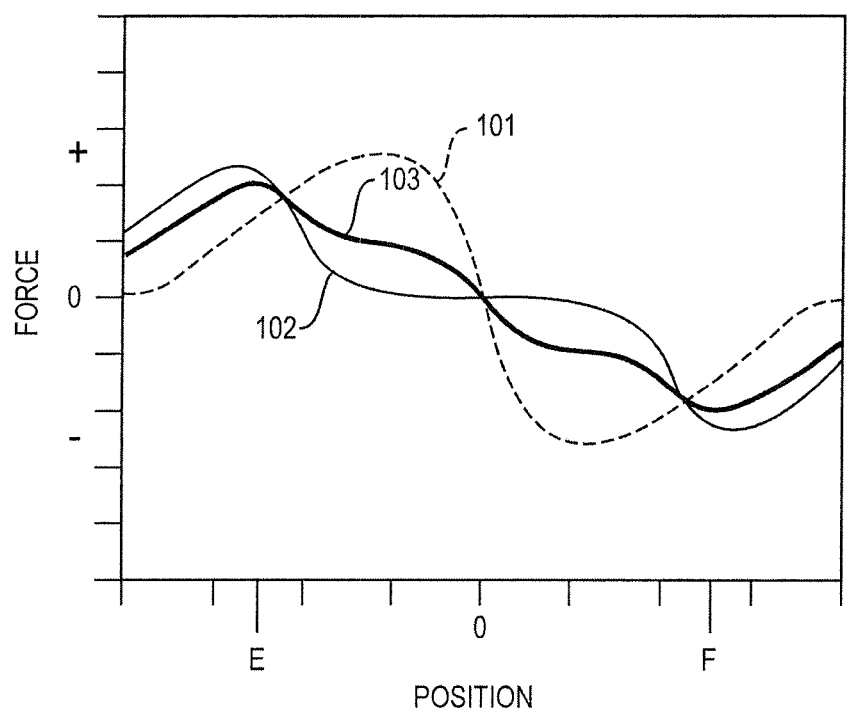
FIG. 6C

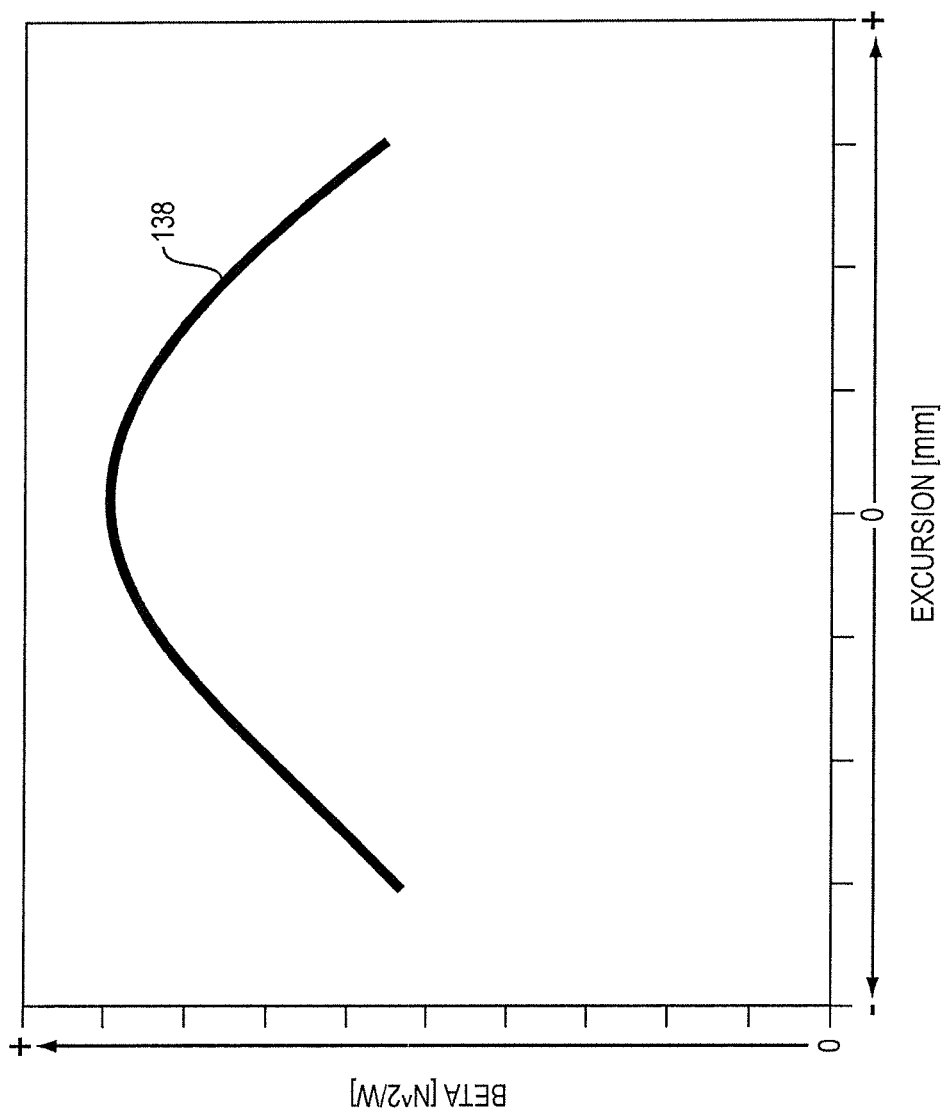

MOVING MAGNET MOTOR AND TRANSDUCER WITH MOVING MAGNET MOTOR

BACKGROUND

This disclosure relates to an electric motor with a moving magnet, and an electro-acoustic transducer with such a motor.

Sealed box transducers expend a significant fraction of their total power dissipation driving the spring elements of their suspension system and the volume of air contained within their housing. Adding a spring with a negative spring constant to the transducer motor can lower the total force required to compress the spring elements of the suspension system and the air volume, and, thereby, increase transducer efficiency.

SUMMARY

All examples and features mentioned below can be combined in any technically possible way.

In one aspect, a moving magnet motor includes a stator comprising first and second spaced coil-wound cores that are separated by an elongated gap, and an elongated magnet located at least in part in the gap and lying generally along a motor depth axis that is in the gap and is generally uniformly offset from the cores. The magnet has poles. The motor has a width axis that is perpendicular to the depth axis and is generally uniformly offset from the cores. The magnet has a width along the motor width axis and the cores each have a width along the motor width axis. Along the motor depth axis, the ratio of the width of the magnet or a pole of the magnet to the width of a core varies.

Embodiments may include one of the following features, or any combination thereof. The magnet may be curved about the motor depth axis. The moving magnet motor may further comprise a magnet position control system comprising a position sensor. The magnet may have a first face that is closest to the first stator core and an opposed second face that is closest to the second stator core; the first magnet face may define a first magnetic pole and the second magnet face may define a second magnetic pole. Each stator core may have two teeth separated by a slot that has a width, and a widest portion of the magnet may have a width that is greater than the width of the slot and a narrowest portion of the magnet may have a width that is approximately the same as the width of the slot.

Embodiments may include one of the following features, or any combination thereof. The gap between the cores may have a center along the depth axis and two ends that are spaced farthest from the center, and the magnet may have a widest portion proximate the center of the gap and narrowest portions proximate the ends of the gap. The width of the magnet may taper smoothly from the widest portion to the narrowest portions. The two teeth of a core may each have center, and the widest portion of the magnet may span a distance approximately from the center of one tooth to the center of the other tooth. The widest portion of the magnet may have a width that is greater than the span from the center of one tooth to the center of the other tooth. The widest portion may have a width that is no greater than the total stator width.

Embodiments may include one of the following features, or any combination thereof. The gap between the cores may have a center along the depth axis and two ends that are spaced farthest from the center. The magnet may have a narrowest portion proximate the center of the gap and widest portions proximate the ends of the gap. The width of the magnet may taper smoothly from the widest portions to the narrowest portion. The two teeth of a core may each have centers, and the widest portions of the magnet may span a distance approximately from the center of one tooth to the center of the other tooth. The widest portion of the magnet may have a width that is greater than the span from the center of one tooth to the center of the other tooth.

Embodiments may include one of the following features, or any combination thereof. The gap between the cores may have a center along the depth axis and two ends that are spaced farthest from the center. The magnet may have a narrowest portion proximate one end of the gap and a widest portion proximate the other end of the gap. The width of the magnet may taper smoothly from the widest portion to the narrowest portion. The two teeth of a core may each have centers, and the widest portion of the magnet may span a distance approximately from the center of one tooth to the center of the other tooth. The widest portion of the magnet may have a width that is greater than the span from the center of one tooth to the center of the other tooth. The width may be no greater than the total stator width.

Embodiments may include one of the following features, or any combination thereof. The magnet may have a generally uniform width along the motor depth axis, a first face that is closest to the first stator core, and an opposed second face that is closest to the second stator core. The first and second magnet faces may each define two different magnetic poles. The poles of the magnet may have a non-uniform width along the depth axis. The magnet may have a length along the motor depth axis, and the width of each pole may taper generally uniformly along at least part of the length of the magnet. A core may comprise three core teeth including a central core tooth that has a width, and the taper may change the width of the magnet poles by an amount approximately equal to the width of the central core tooth. The central core tooth may have edges, and the poles of the magnet may meet at a magnet pole border. Proximate a first end of the magnet the magnet pole border may be generally aligned with the first central core edge and at a second end of the magnet the magnet pole border may be generally aligned with the second central core edge.

In another aspect, a moving magnet motor includes a stator comprising first and second spaced coil-wound cores that are separated by an elongated gap, and an elongated magnet located at least in part in the gap and lying generally along a motor depth axis that is in the gap and is generally uniformly offset from the cores. The motor has a width axis that is perpendicular to the depth axis and is generally uniformly offset from the cores. The magnet has faces that face each of the cores. The magnet comprises two portions that have opposite magnetic poles on the same faces of the magnet, where the portions meet at a border, and are each tapered along the motor depth axis in a complementary fashion. The magnet has a relatively constant width along the motor width axis.

In another aspect, an electro-acoustic transducer includes a housing, a radiating surface coupled to the housing such that it can move relative to the housing, and a moving magnet motor that is configured to move the radiating surface relative to the housing so as to generate sound. The moving magnet motor comprises a stator comprising spaced cores that are separated by an elongated gap, and an elongated magnet located at least in part in the gap. The magnet has a central portion and two end portions. The magnet or a pole of the magnet is tapered in width from the central portion to each end portion.

Embodiments may include one of the following features, or any combination thereof. The transducer may also include a lever arm that is coupled to the radiating surface and is moved by the magnet, and a magnet position control system comprising a position sensor that senses a position of the lever arm. The position sensor may include a magnet that is fixed to the lever arm, and a magnet sensor that is fixed relative to the lever arm.

BRIEF DESCRIPTION OF THE DRAWINGS

FIGS. 6A and 6B are partial schematic cross-sectional views of a motor similar to that of FIG. 1 but with a variable-width magnet.

FIG. 6C is a force vs. position plot for the motor of FIGS. 6A and 6B.

FIG. 9 is a plot of magnet Beta vs. cone excursion for the transducer of FIG. 7.

DETAILED DESCRIPTION

Acoustic transducers have a mechanical resonance frequency. Small sealed transducers tend to have a relatively high resonance frequency due to the stiffness of both the sealed air volume and the stiffness of the suspension elements suspending the moving parts. A significant amount of the total energy is dissipated in energy dissipating elements of the transducer (mainly the field coil(s)) to compress the air in the sealed box and the suspension elements. The transducer is made more energy efficient by adding a negative spring to the transducer. In transducers with a moving magnet motor, where the magnet moves the transducer diaphragm, the motor can be designed to have a negative stiffness due to the cogging forces between the moving magnet and the magnetic steel parts of the stator(s).

Figure 1:
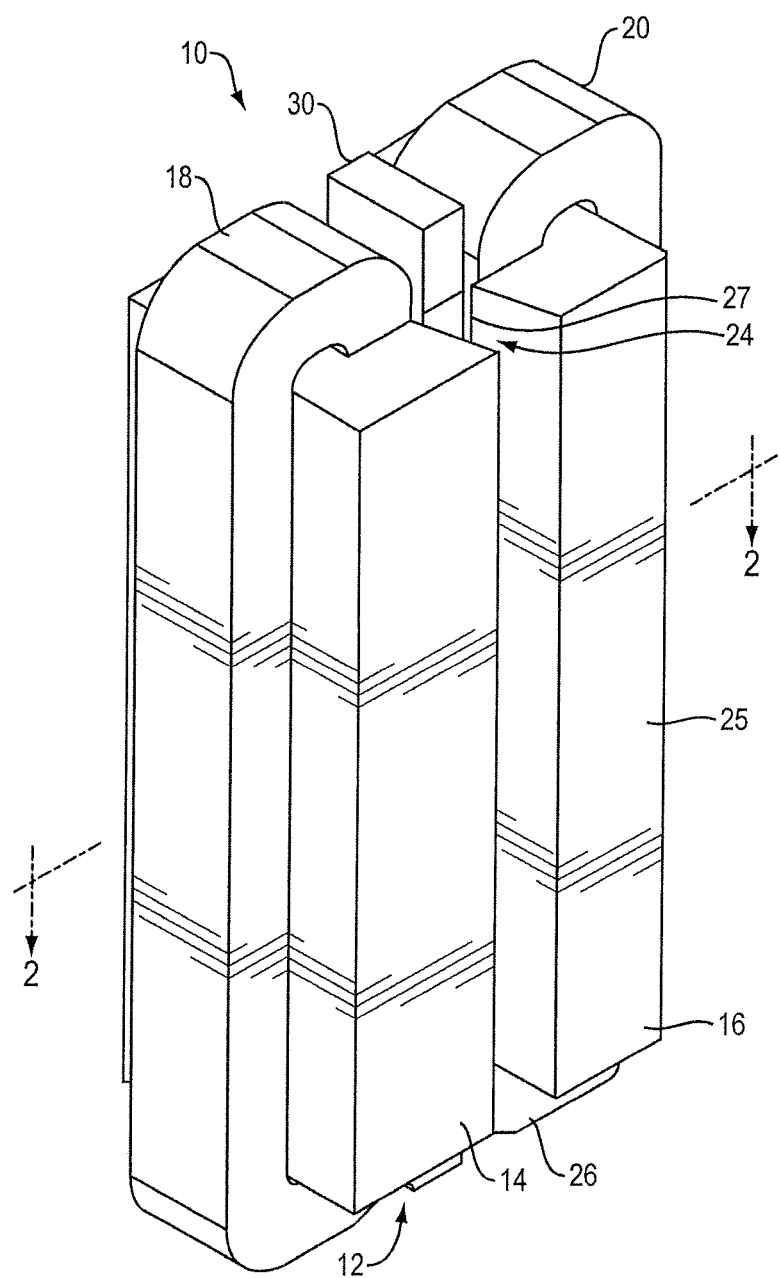
FIG. 1 is an isometric view of a moving magnet motor.
Figure 2:
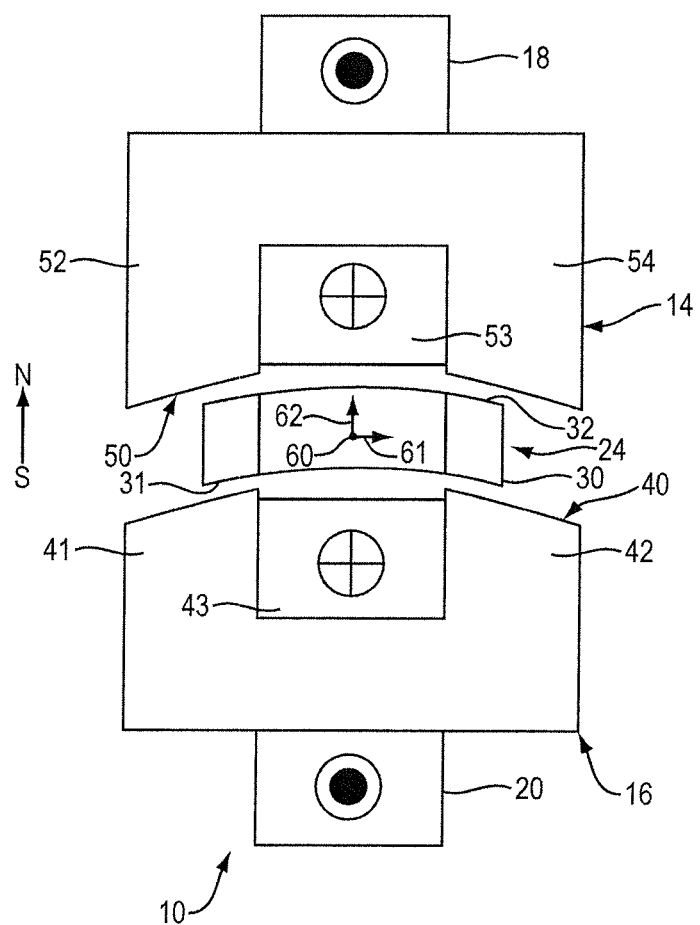
FIG. 2 is a cross-sectional view taken along line 2-2, FIG. 1.
Figure 3:
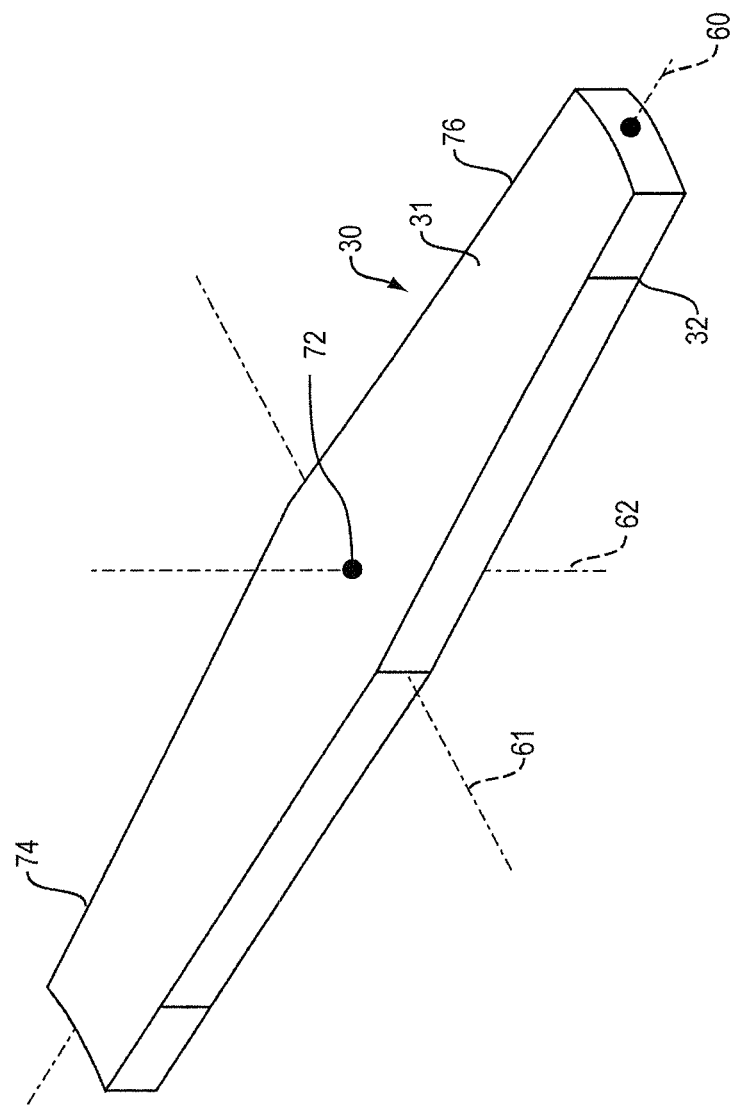
FIG. 3 is an isometric view of the moving magnet of the motor of FIGS. 1 and 2.

One non-limiting example of a moving magnet rotary motor 10 is depicted in FIGS. 1-3. Moving magnet motor 10 includes stator 12 and moving magnet 30. Stator 12 has first coil-wound core 14 (with coil 18) and second coil-wound core 16 (with coil 20). Elongated magnet 30 is located in gap 24 between cores 14 and 16. Gap 24 includes gap center 25 and ends 26 and 27. Typically, but not necessarily, magnet 30 extends through the entire length of gap 24, from end 26 to end 27. The magnet may be longer than this (as shown in FIG. 1) or shorter than this.

As best shown in the cross-sectional view of FIG. 2, in this example core 14 has teeth 52 and 54 separated by slot 53. Core 14 has inner face 50 that faces gap 24. Coil 18 is wound in slot 53. Core 16 has teeth 41 and 42 that are separated by slot 43. Core 16 has inner face 40 that faces gap 24, Coil 20 is wound in slot 43. In this arrangement the cores can act as bobbins for coil winding. Motor 10 has a depth axis 60 that is centered in gap 24 and so is generally uniformly offset from both cores. Magnet 30 lies at least generally along axis 60; in this non-limiting case magnet 30 is centered in uniform gap 24 such that it is equidistant from core faces 50 and 40, and magnet 30 has a central longitudinal axis that is coincident with motor axis 60. One pole of magnet 30 (in this non-limiting case, the north pole) faces core 14 and the other pole (the south pole) faces core 16. This could be reversed. In this example, however, the entirety of each face of magnet 30 defines a single magnetic pole (face 32 defines the north pole and face 31 defines the south pole). Motor 10 also has width axis 61 that is at least generally perpendicular to depth axis 60 and is generally uniformly offset from core faces 40 and 50. When gap 24 is curved (to accommodate rotary motion of magnet 30), axis 61 is similarly curved. Magnet 30, cores 14 and 16, core teeth 52, 54, 41 and 42, and slots 53 and 43 each have a width along (i.e., either coincident with or generally parallel to) motor width axis 61. Motor 10 also has height axis 62 that is perpendicular to axis 60 and to axis 61.

Magnet 30 and/or stators 14 and 16 are constructed and arranged such that along axis 60 the ratio of the width of magnet 30, or the width of a pole of magnet 30, to the width of one or both of cores 14 and 16, varies. The width variation can be accomplished in several manners, only some of which are depicted in the drawings. In the manner depicted for motor 10, FIGS. 1-3, the width of magnet 30 varies along axis 60, while the cores each have a constant width along axis 60. In this non-limiting example, magnet 30 is widest at its center 72 that lies along central motor width axis 61, and the width tapers to ends 74 and 76, where it is most narrow. See FIG. 3. The tapers in this case are constant along the length of the magnet to the narrow ends, but the taper could be variable with length and also the width variation can be discontinuous (rather than continuous as shown in FIG. 3). An alternative would be to taper the cores and use a constant width magnet, or some combination of tapered cores and a tapered magnet (or, more generally, a magnet with a varied width), as is further described below.

Motor 10 is constructed and arranged to accomplish rotary motion. Thus, magnet 30 is curved (cupped) about axis 60 and the inner faces of the cores are similarly curved, to define a generally constant-width gap 24. In this case, axis 61 would also be curved. Magnet 30 is moved along a circular arc that is generally parallel to and equally offset from core faces 40 and 50. Magnet 30 can protrude from one or both ends of the stator gap so that it can be mechanically coupled to the structure being moved by the motor. In one non-limiting example, such structure includes the diaphragm of an electro-acoustic transducer. Rotary motors per se are well known in the field and so not all aspects of the motor, such as coil winding and some aspects of motor control, are described herein.

Figure 4A:
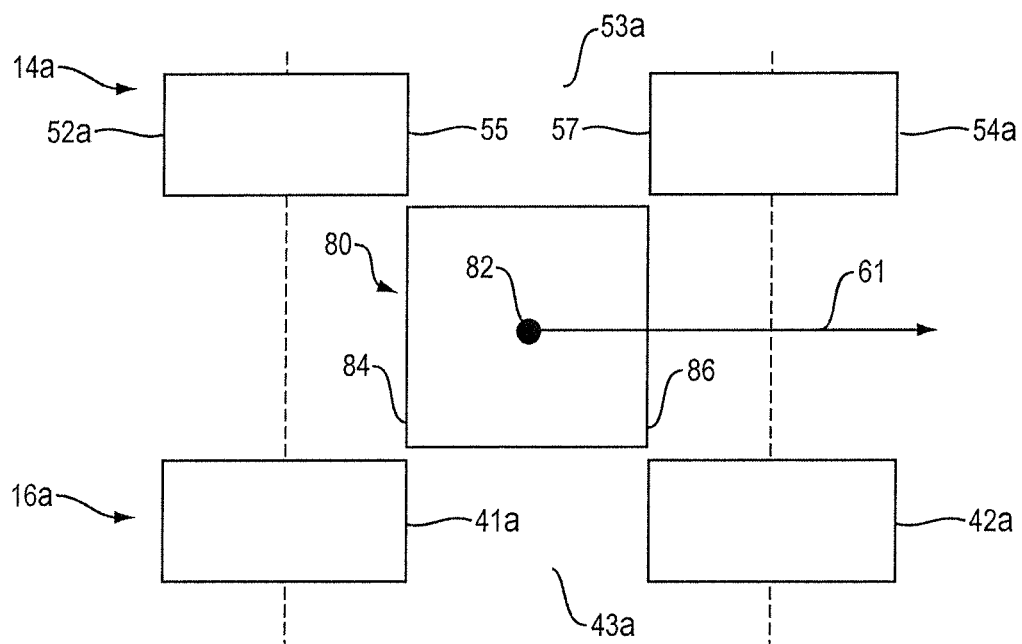
FIG. 4A is a partial schematic cross-sectional view of a motor similar to that of FIG. 1 but with a narrow magnet.

Motor 10 is constructed and arranged to exhibit negative stiffness over at least some of its range of motion. This is further explained with reference to FIGS. 4-6. FIG. 4A is a schematic cross-sectional view of portions of a hypothetical linear motor with single slot stator cores 14a and 16a (with slots 53a and 43a, respectively; the coils are not shown simply for ease of illustration). Magnet 80 in this case has a constant width that is equal to the width of slots 53a and 43a. Thus, when magnet 80 is in its central position shown in FIG. 4A, sides 84 and 86 of magnet 80 are aligned with sides 55 and 57 of slot 53a. Magnet center 82 is equidistant between core teeth 52a and 54a, and core teeth 41a and 42a. In this hypothetical illustration, magnet 80 has a width of 2 mm, the stator teeth are 2 mm wide and the stator slots are 2 mm wide.

Figure 4B:
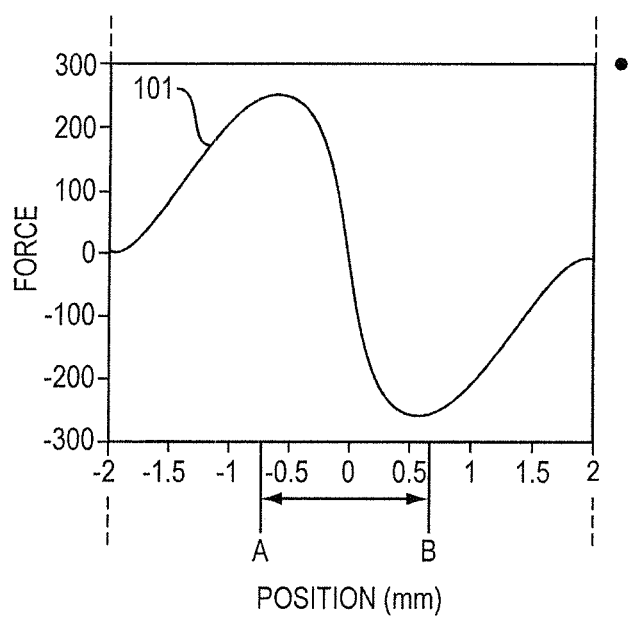
FIG. 4B is a force vs. position plot for the motor of FIG. 4A.

As is evident from the zero-current force vs. magnet position plot 101 of FIG. 4B (which plots on the x axis the position of magnet center 82 along axis 61), between the positions marked A and B the motor exhibits a decreasing force, known as a negative stiffness. As defined here, the force is the external force acting on the magnet due to the magnet's attraction to the steel stator parts acting along the x-axis (axis 61) direction. For excursions near the center position this force is a restoring force. The force peaks at about 0.6 mm on either side of the center (0) position. Between these peaks the motor exhibits negative cogging force. Over a good portion of this negative force region the force change with distance is generally linear.

Figure 5A:
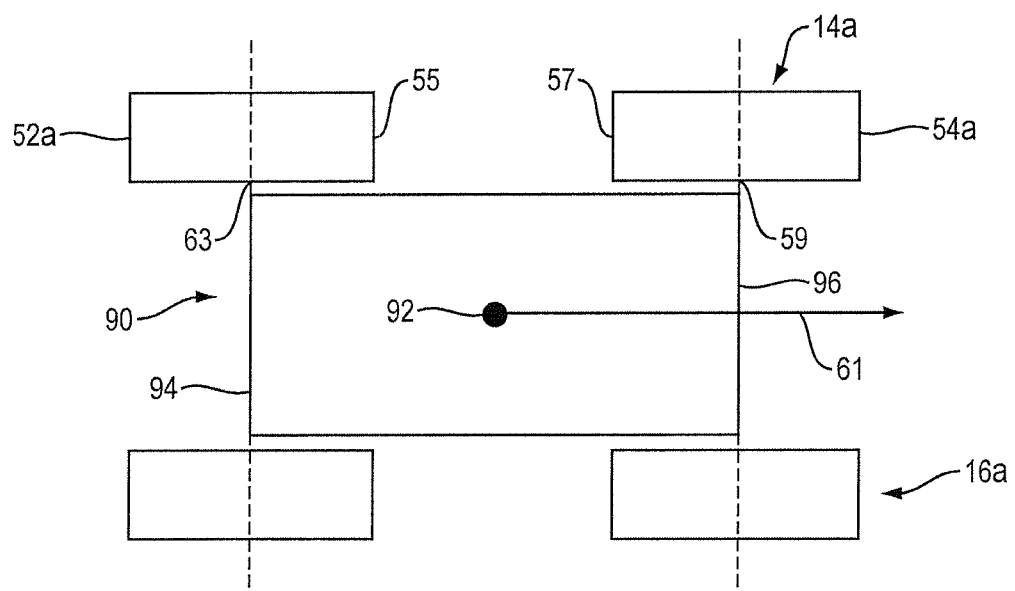
FIG. 5A is a partial schematic cross-sectional view of a motor similar to that of FIG. 1 but with a wide magnet.
Figure 5B:
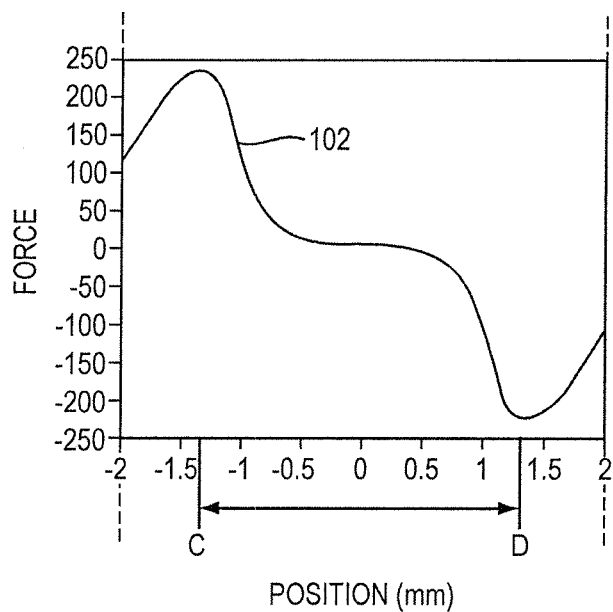
FIG. 5B is a force vs. position plot for the motor of FIG. 5A.

FIGS. 5A and 5B are similar to FIGS. 4A and 4B, except that the magnet 90 is wider than magnet 80. Magnet 90 has a constant width equal to the distance from center 63 of stator core tooth 52a to center 59 of stator core tooth 54a (the width in this non-limiting example is 4 mm). Thus, in the neutral position shown in FIG. 5A magnet side 94 is aligned with point 63 and magnet side 96 is aligned with point 59. In an alternative example, the widest portion of the magnet may have a width that is greater than the span from the center of one tooth to the center of the other tooth, and no greater than the total stator width.

The zero current or cogging force of the motor of FIG. 5A is shown by plot 102, FIG. 5B, in which the position of magnet center 92 is plotted on the x axis. Negative stiffness is exhibited from point C to point D, with an essentially zero force from about +0.5 to −0.5 mm.

An exemplary variable-width magnet can comprise about ⅔ of its length of the width of magnet 90 (FIG. 6B) and about ⅓ its length at the narrower width of magnet 80 (FIG. 6A), with the widest part at the center of the magnet and the narrow parts at or close to the two ends. The force vs. position plot for such a magnet is shown as plot 103, FIG. 6C. Plots 101 and 102 are also shown for comparison. This motor exhibits generally linear negative cogging stiffness from about point E to about point F. This is but one of many possible configurations of a tapered magnet that can be used in the motor, where the magnet width is not constant along its length.

The operation of a motor with tapered width magnet 30, FIG. 3, can be better understood referencing the data of FIGS. 4-6. Its width at center 72 is the same as magnet 90 and its width at or close to distal locations 74 and 76 is the same as that of magnet 80. The extreme end portions of magnet 90 that protrude from the stator gap do not appreciably contribute to motor functionality and so their width is not considered further herein. The shape of the taper (wide in the middle and narrow toward the ends, and with a generally linear taper) is such that off axis cogging moment about axis 62 is zero. If the magnet was wide at one end and narrow at the other end with linear taper between the ends, there would be a non-zero cogging moment about axis 62, which might place some stress on other mechanical members such as bushing 114, FIG. 7. However, the desired cogging moment about axis 60 would be nearly unchanged. The moment about axis 61 would be zero in either case.

Figure 7:
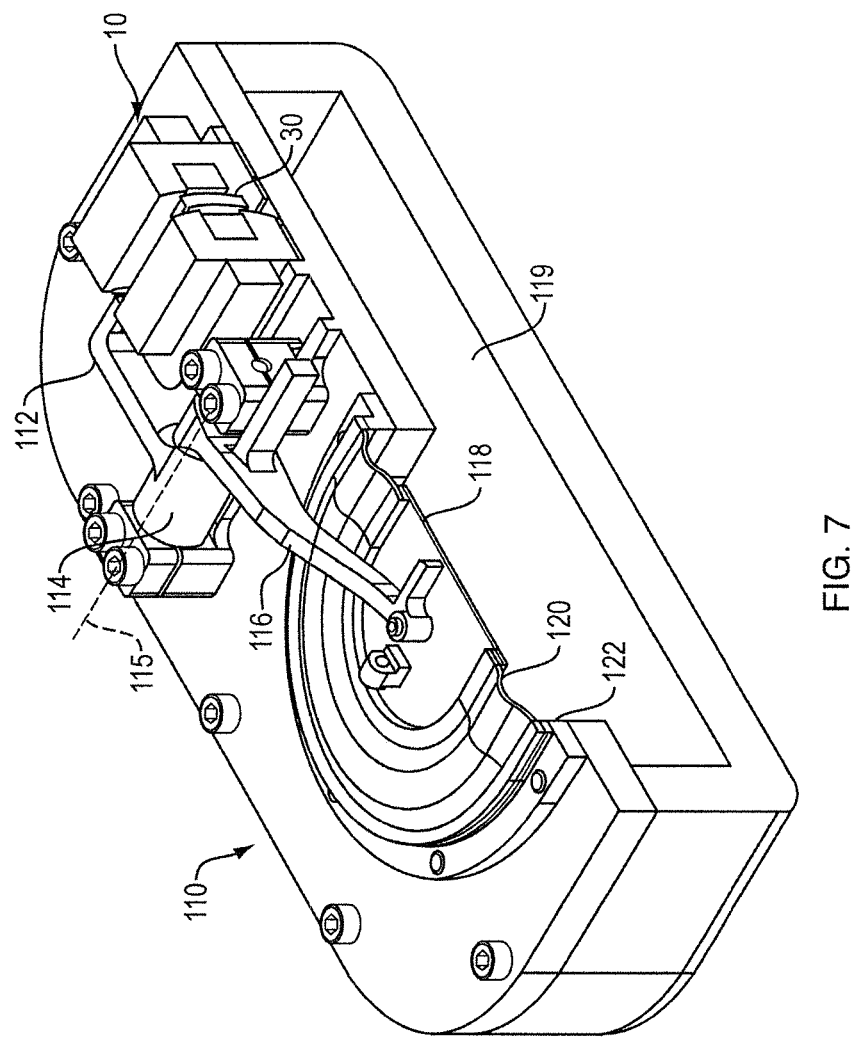
FIG. 7 is a cross-sectional view of an electro-acoustic transducer using the motor of FIGS. 1-3 to drive the transducer cone, where the transducer is bilaterally symmetric about the cross-sectional axis.

Motor 10 can be used in any situation in which a negative cogging force rotary motor is needed or would be useful. One non-limiting example is shown in FIG. 7, where motor 10 is used to move sound-emanating surface (cone) 118 of electro-acoustic transducer 110. In this case the protruding ends of magnet 30 are mechanically coupled to arm 112 which is fixed to bushing 114 that is adapted to rotate about axis 115. This drives lever 116. Lever 116 is coupled to and drives (vibrates) cone 118. Surround 120 isolates cone 118 from housing 122. The desired peak-to-peak cone motion can be accomplished by proper design of the total excursion of magnet 30 and the designs of arm 112, bushing 114 and lever 116. Transducer 110 has (typically sealed) back volume 119 which, as described above, increases the stiffness of the transducer. The motor efficiency effects of the stiffness can be ameliorated by the negative cogging force of the moving magnet motor 10.

Figure 8:
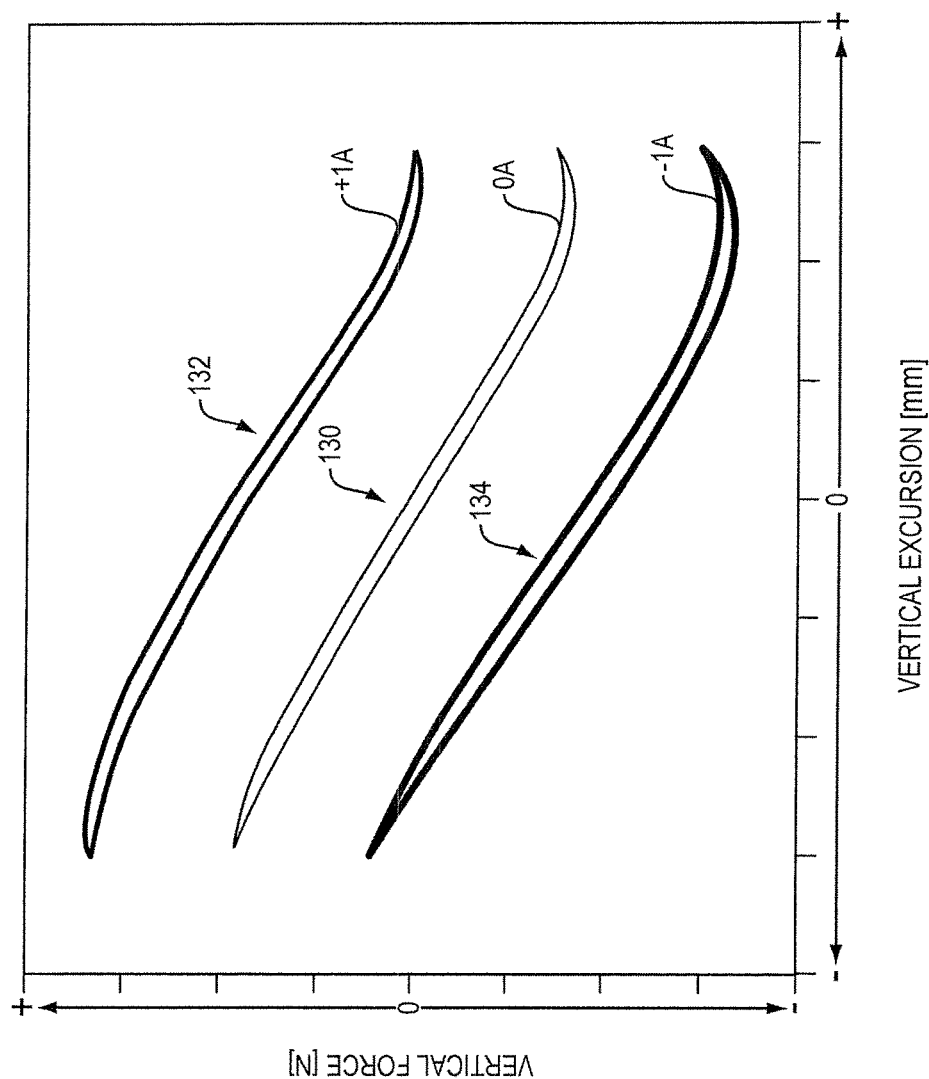
FIG. 8 includes force vs. excursion plots for the transducer of FIG. 7.

FIG. 8 includes measurements made of transducer 110, FIG. 7. The cone excursion is plotted for different forces, at three levels of current applied to the motor (0 Amps curve 130, +1 Amp curve 132 and −1 Amp curve 134). At all three levels the transducer exhibits negative stiffness over an excursion of approximately 3.5 mm. The transducer thus has fairly consistent behavior over a large operating range. Mechanical and magnetic losses account for the hysteresis evident from the curves. FIG. 9 includes plot 138 of the efficiency figure-of-merit (Beta) (expressed as $N^2/W$) defined as the motor constant squared divided by the input electrical resistance vs. cone excursion for transducer 110, FIG. 7. The offsets that are evident in FIGS. 8 and 9 are due to measurement error and/or tolerances in the magnetics and mechanical parts.

Figure 10A:
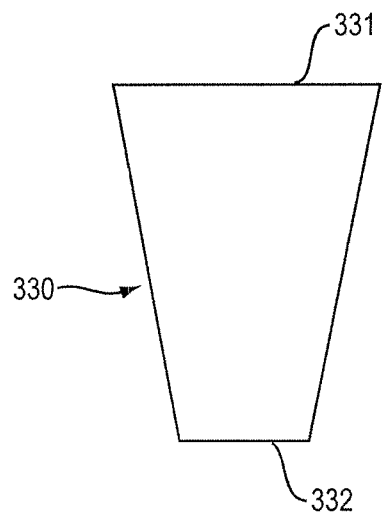
FIGS. 10A and 10B are front views of alternative shapes of a magnet for a moving magnet motor.
Figure 10B:
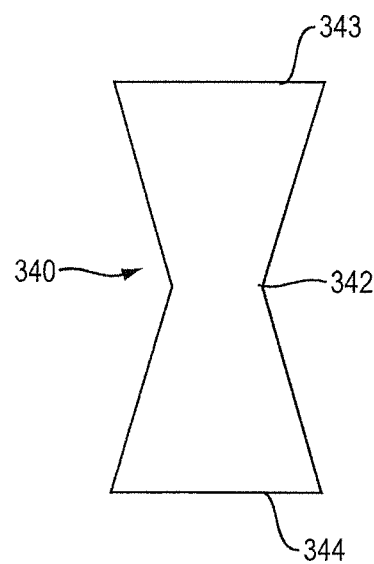

FIGS. 10A and 10B are front views of two additional examples of a tapered magnet that can be used in the moving magnet motor. Magnet 330, FIG. 10A is wider at one end 331 than it is at the other end 332. The taper can be linear or not, and can be constant or not. Magnet 340, FIG. 10B, has a general hourglass shape with narrow middle 342 and wider ends 343 and 344. The two tapers can be the same or not, can be linear or not, and can be constant or not. The widest portions and the narrowest portions can have the relationships described above relative to FIGS. 4-6, or not. In an alternative example, the widest portion of the magnet may have a width that is greater than the span from the center of one tooth to the center of the other tooth, and no greater than the total stator width. Also, other magnet shapes with widths that are not constant along their length are contemplated and included herein.

A second style of magnet for the moving magnet motor, and the Beta and cogging force for a motor using this magnet, are disclosed in FIGS. 11-14. Magnet 150, FIG. 11A, has a constant or close to constant width along motor depth axis 60a. Magnet 150 comprises first portion 154 and second portion 152. These two portions have opposite magnetic poles on the same faces, Thus, for example, portion 154 may have its north pole on face 157 in which case portion 152 has its south pole on face 157. The poles of the two portions are opposite on the opposed magnet face 158. Portions 152 and 154 meet at border 156 and are each tapered in a complementary fashion to create a structure with a uniform or close to uniform width. Magnet 262, FIG. 11B, is an alternative to magnet 150. Magnet 262 also has a constant or close to constant width, and has two magnetic poles on each face, as accomplished with first portion 263 which has its north pole on the face 268 that can be seen in the drawing and second portion 264 which has its south pole on face 268. In this case, though, border 265 where portions 263 and 264 meet is tapered from each end to the middle. This taper is equal to the distance between lines 266 and 267.

Figure 11A:
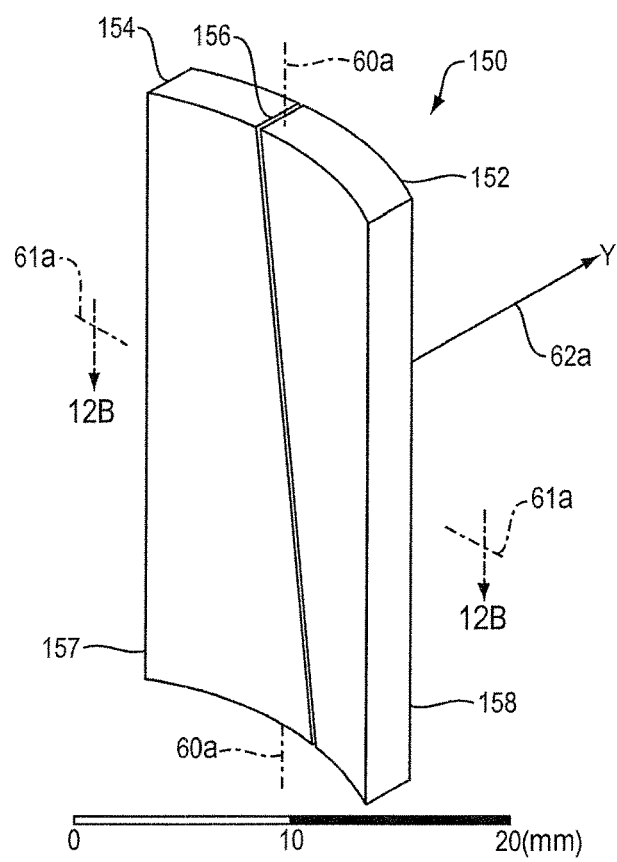
FIG. 11A is an isometric view of a magnet for a moving magnet motor.
Figure 11B:
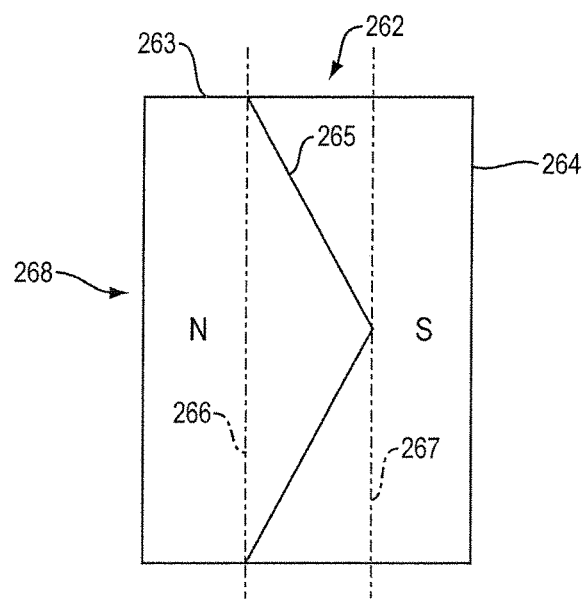
FIG. 11B is a front view of another magnet for a moving magnet motor.
Figure 12A:
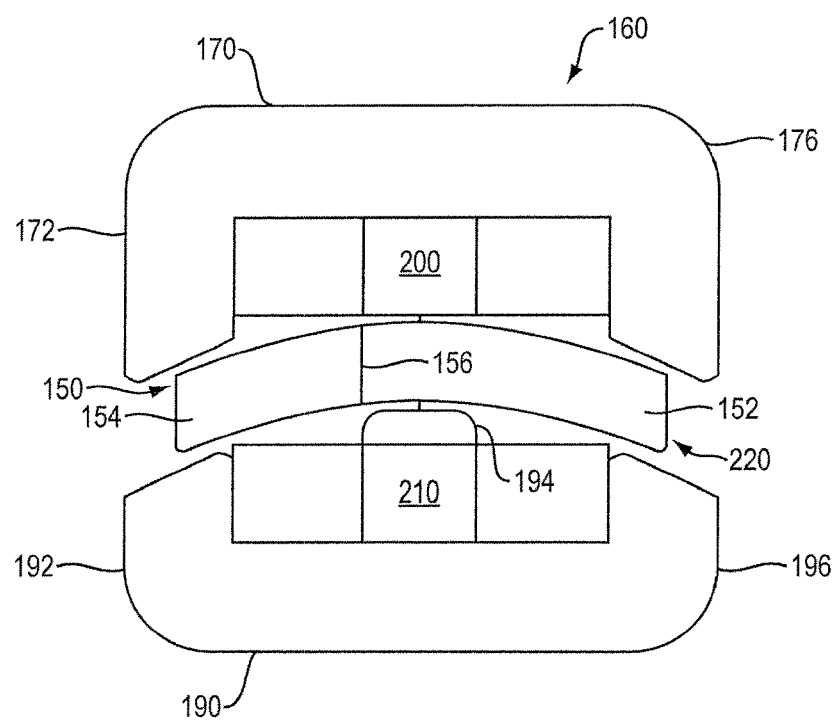
FIG. 12A is a top view of a motor with the magnet of FIG. 11.
Figure 12B:
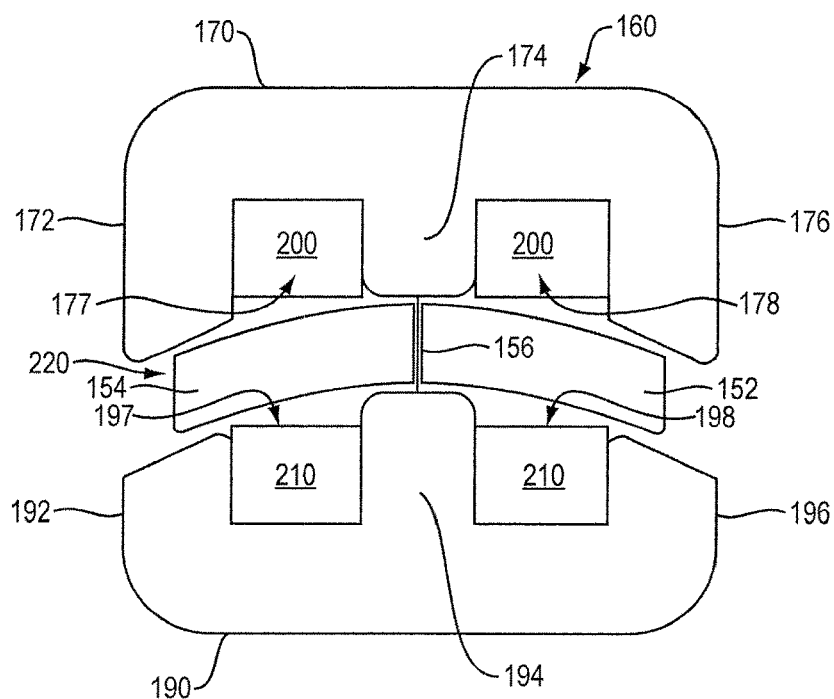
FIG. 12B is a midline cross-sectional view of the motor of FIG. 12A.

Rotary motor 160 using movable magnet 150 is schematically depicted in FIGS. 12A and 12B. FIG. 12A is a top view and FIG. 12B is a cross-section taken along line 12B-12B in FIG. 11 (which is the center of the motor). Stator cores 170 and 190 each include three core teeth rather than two. Core 170 has teeth 172, 174 and 176 separated by slots 177 and 178 in which coil 200 is wound. Core 190 has teeth 192, 194 and 196 separated by slots 197 and 198 in which coil 210 is wound. Core tooth 194 projects into elongated gap 220 more than does opposite tooth 174 because the relatively constant width gap is curved about the motor depth axis so as to accommodate rotary motion along a circular arc. The two coils 200 and 210 may or may not be identical to maximize the amount of conductor. At the center of the motor (FIG. 12B), border 156 is centered in gap 220 and is thus centered on teeth 174 and 194. At the end of the motor (FIG. 12A), border 156 is aligned with the left edge of center teeth 174 and 194. At the other end (not shown) border 156 would be aligned with the right edge of center teeth 174 and 194. The width variation of each magnet portion 152 and 154 along its effective length is thus equal to the width of the center stator teeth 174 and 194. The overall width of magnet 150 is from the center of left teeth (172 and 192) to center of right teeth (176 and 196). The magnet width, and the length and the width of the taper, could be varied without departing from the scope of the disclosure. For example, when magnet 262, FIG. 11B, is used in motor 160, the width variation of each magnet portion 263 and 264 can also be equal to the width of the center stator teeth, which is equal to the distance between lines 266 and 267.

The slot and tooth arrangements of the stators allow the coils to be wound and then easily assembled into the core. Motor 160 uses the coils more efficiently than does motor 10 since both legs of the coils contribute to magnetic flux in the core. Also there is less flux leakage than in motor 10. Low leakage fields are generally desirable, particularly in consumer products such as portable devices that can play sound (e.g., smartphones), to inhibit adverse interaction with other electronic devices such as pacemakers.

Figure 13:
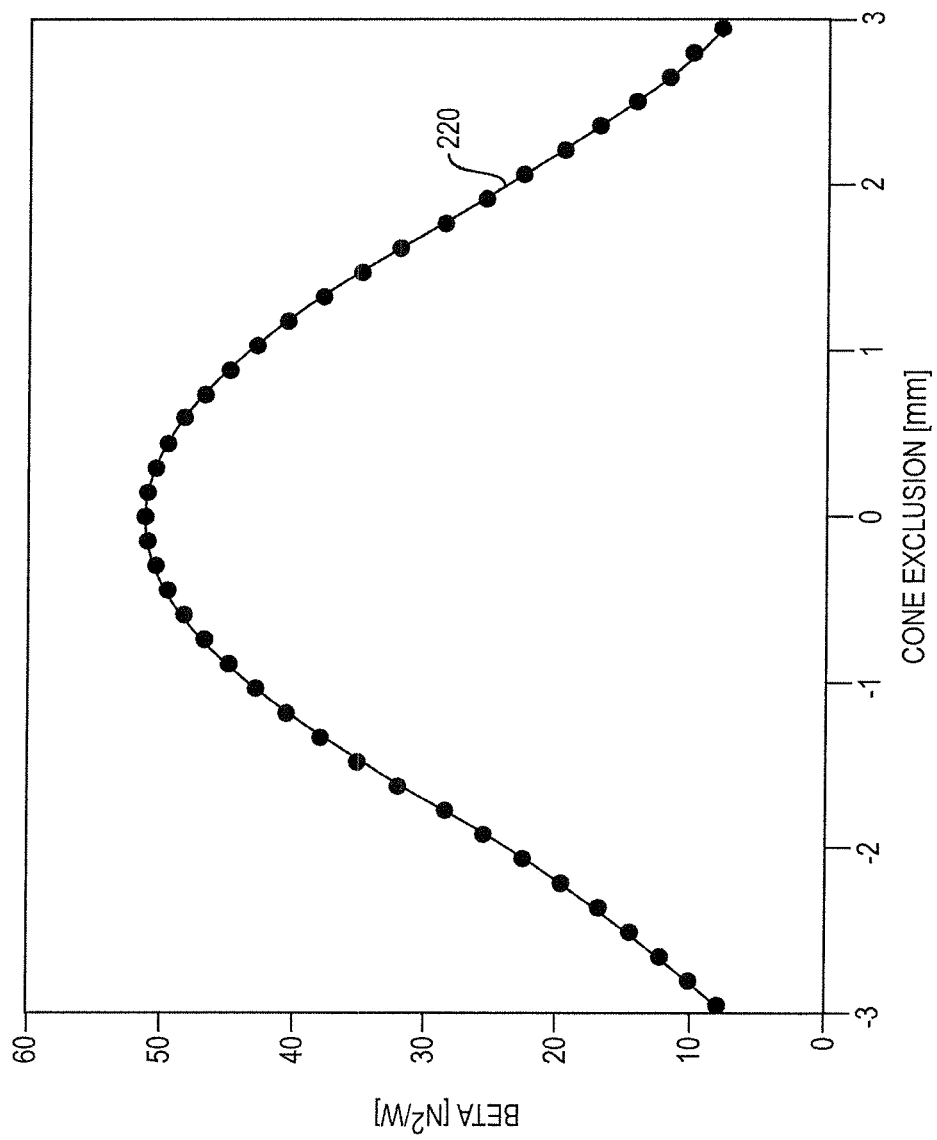
FIG. 13 is a plot of magnet Beta vs. cone excursion for a transducer using the motor of FIGS. 12A and 12B.
Figure 14:
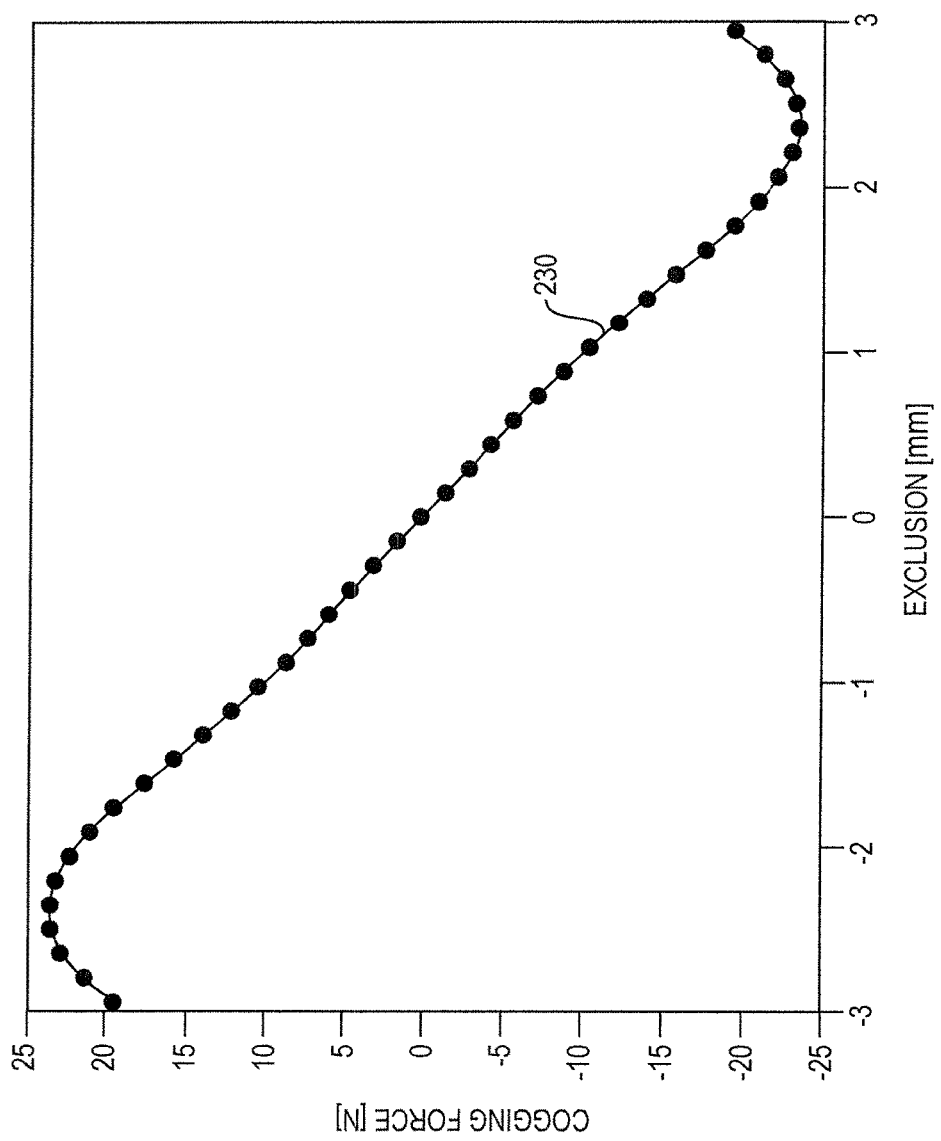
FIG. 14 is a plot of motor cogging force vs. cone excursion for a transducer using the motor of FIGS. 12A and 12B.

FIG. 13 plots 220 the Beta vs. cone excursion for motor 160, while FIG. 14 plots 230 the zero-current cogging force vs cone excursion of the motor with a 17 mm long lever 116. The negative cogging force is essentially linear over a 4 mm peak to peak excursion.

In both examples depicted in the drawings the tapering of the magnet or of the magnetization decreases the peak Beta at the center stroke position only slightly. The magnets have low volume and so are less expensive than the magnets for moving coil motors. The magnet material may be Neodymium-Iron-Boron or other magnetic material. The stator cores may either be laminated or may be made of solid ferromagnetic material.

Figure 15:
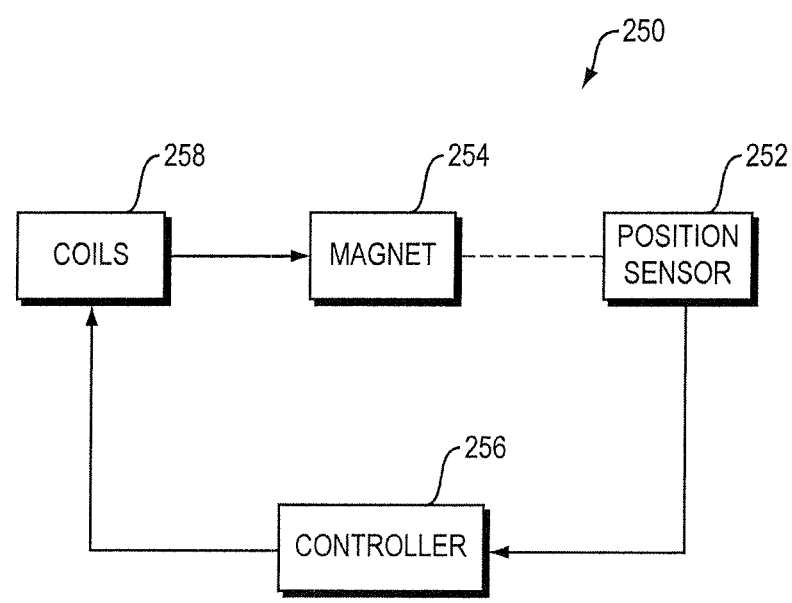
FIG. 15 is a schematic block diagram of a system for controlling the position of the moving magnet of a moving magnet motor.

FIG. 15 is a schematic block diagram of a system 250 for controlling the position of moving magnet 254 of a moving magnet motor. At low frequency (below about 20 Hz), the stiffness of the back cavity is small due to air leakage from the sealed box to the ambient and the total stiffness of the transducer, therefore, may be negative. The entire system is thus inherently unstable. A feedback control loop can be used to maintain the transducer at a long-term average zero position. Even though the control loop may operate at frequencies below audible, it still may be effective to reduce audible distortion. It may also allow for more aggressive transducer excursions as the transducer cone will be more consistently centered between its travel extremes. The control loop requires a position sensor. A position sensor (such as a Hall effect sensor or another type of sensor known in the field) detects the position of motor magnet 254. A non-contact position sensor such as a Hall effect sensor with a fixed sensing portion and a moving sense magnet can be used. A controller 256 uses this position (and usually other information not shown in the figure such as the operational requirements of the system that uses the motor (not shown) that has magnet 254 and coils 258) to control the current supplied to motor coils 258 so as to position the motor magnet as required. Since the magnet of a moving magnet motor with negative cogging force is inherently unstable, such feedback control is typically required. At acoustic frequencies, the box stiffness is non-zero and generally larger than the negative cogging stiffness. The total stiffness is, thereby, positive and the system at acoustic frequencies is stable.

Hall sensors are extremely sensitive to small magnetic fields. In order to isolate the Hall sensor from the magnetic fields from the coils and permanent magnet of the motor, in the example of FIG. 7, the Hall effect position sensor can be mounted spaced from the motor. For example, the sensing portion of a Hall sensor can be mounted to mechanical ground (i.e., fixed relative to transducer motion) adjacent to lever 116, and the moving portion of the Hall sensor (the magnet) that is sensed by the sensing portion can be mounted to lever 116 proximate the sensing portion. The Hall effect magnet is preferably low-mass (e.g., about 60 micrograms) and oriented such that its N-S axis is generally orthogonal to the pivot axis 115. The gap between the sensor and magnet can be from about 0.5 mm to about 2 mm. The field strength of the magnetic fields from the motor at this position and in this orientation, are at or very close to zero. Accordingly, the sensor location and magnet orientation result in little or no interference from the motor. Since lever arm 116 is (indirectly) coupled to the moving magnet of motor 10, the control system is able to translate the position of the lever arm to the position of the moving magnet of the motor.

Elements of a figure are shown and described as discrete elements in a block diagram in FIG. 15. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Embodiments of the systems and methods described above comprise computer components and computer-implemented steps (e.g., operation of the controller) that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMs, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A moving magnet motor, comprising:
a stator comprising first and second spaced coil-wound cores that are separated by an elongated gap;
an elongated magnet located at least in part in the gap and lying generally along a motor depth axis that is in the gap and is generally uniformly offset from the cores, where the magnet has poles;
wherein the motor has a width axis that is perpendicular to the depth axis and is generally uniformly offset from the cores;
wherein the magnet has a width along the motor width axis and the cores each have a width along the motor width axis;
wherein along the motor depth axis the magnet or a pole of the magnet has a variable width.

2. The moving magnet motor of claim 1, wherein the magnet has a first face that is closest to the first stator core and an opposed second face that is closest to the second stator core, and wherein the first magnet face defines a first magnetic pole and the second magnet face defines a second magnetic pole.

3. The moving magnet motor of claim 2, wherein each stator core has two teeth separated by a slot that has a width, and wherein the widest portion of the magnet has a width that is greater than the width of the slot and the narrowest portions of the magnet have widths that are approximately the same as the width of the slot.

4. The moving magnet motor of claim 3, wherein the gap between the cores has a center along the depth axis and two ends that are spaced farthest from the center, and wherein the magnet has a widest portion proximate the center of the gap and narrowest portions proximate the ends of the gap.

5. The moving magnet motor of claim 4, wherein the width of the magnet tapers smoothly from the widest portion to the narrowest portions.

6. The moving magnet motor of claim 4, wherein the two teeth of a core have centers, and wherein the widest portion of the magnet spans a distance approximately from the center of one tooth to the center of the other tooth.

7. The moving magnet motor of claim 4, wherein the two teeth of a core have centers, and wherein the widest portion of the magnet has a width that is greater than the span from the center of one tooth to the center of the other tooth.

8. The moving magnet motor of claim 3, wherein the gap between the cores has a center along the depth axis and two ends that are spaced farthest from the center, and wherein the magnet has a narrowest portion proximate the center of the gap and widest portions proximate the ends of the gap.

9. The moving magnet motor of claim 8, wherein the width of the magnet tapers smoothly from the widest portions to the narrowest portion.

10. The moving magnet motor of claim 8, wherein the two teeth of a core have centers, and wherein the widest portions of the magnet span a distance approximately from the center of one tooth to the center of the other tooth.

11. The moving magnet motor of claim 8, wherein the two teeth of a core have centers, and wherein the widest portion of the magnet has a width that is greater than the span from the center of one tooth to the center of the other tooth.

12. The moving magnet motor of claim 3, wherein the gap between the cores has a center along the depth axis and two ends that are spaced farthest from the center, and wherein the magnet has a narrowest portion proximate one end of the gap and a widest portion proximate the other end of the gap.

13. The moving magnet motor of claim 12, wherein the width of the magnet tapers smoothly from the widest portion to the narrowest portion.

14. The moving magnet motor of claim 12, wherein the two teeth of a core have centers, and wherein the widest portion of the magnet span a distance approximately from the center of one tooth to the center of the other tooth.

15. The moving magnet motor of claim 12, wherein the two teeth of a core have centers, and wherein the widest portion of the magnet has a width that is greater than the span from the center of one tooth to the center of the other tooth.

16. The moving magnet motor of claim 1, wherein the magnet has a generally uniform width along the motor depth axis and a first face that is closest to the first stator core and an opposed second face that is closest to the second stator core, and wherein the first and second magnet faces each define two different magnetic poles.

17. The moving magnet motor of claim 16, wherein the poles of the magnet have a non-uniform width along the depth axis.

18. The moving magnet motor of claim 17, wherein the magnet has a length along the motor depth axis, and the width of each pole tapers generally uniformly along at least part of the length of the magnet.

19. The moving magnet motor of claim 18, wherein a core comprises three core teeth including a central core tooth that has a width, and wherein the taper changes the width of the magnet poles by an amount approximately equal to the width of the central core tooth.

20. The moving magnet motor of claim 19, wherein the central core tooth has edges, and wherein the poles of the magnet meet at a magnet pole border, and wherein proximate a first end of the magnet the magnet pole border is generally aligned with the first central core edge and proximate a second end of the magnet the magnet pole border is generally aligned with the second central core edge.

21. The moving magnet motor of claim 19, wherein the central core tooth has edges, and wherein the poles of the magnet meet at a magnet pole border, and wherein proximate a first end of the magnet the magnet pole border is generally aligned with the first central core edge, proximate a second end of the magnet the magnet pole border is generally aligned with the first central core edge, and between the ends the magnet pole border is generally aligned with the second central core edge.

22. The moving magnet motor of claim 1, wherein the magnet is curved about the motor depth axis.

23. An electro-acoustic transducer, comprising:
a housing:
a radiating surface coupled to the housing such that it can move relative to the housing; and
a moving magnet motor that is configured to move the radiating surface relative to the housing so as to generate sound, wherein the moving magnet motor comprises a stator comprising spaced cores that are separated by an elongated gap and an elongated magnet located at least in part in the gap, wherein the magnet has a central portion and two end portions, and wherein the magnet or a pole of the magnet is tapered in width from the central portion to each end portion.

24. The transducer of claim 23, further comprising a lever arm that is coupled to the radiating surface and is moved by the magnet, and a magnet position control system comprising a position sensor that senses a position of the lever arm.

25. The transducer of claim 24, wherein the position sensor comprises a magnet fixed to the lever arm, and a magnet sensor that is fixed relative to the lever arm.

26. A moving magnet motor, comprising:
a stator comprising first and second spaced coil-wound cores that are separated by an elongated gap;
an elongated magnet located at least in part in the gap and lying generally along a motor depth axis that is in the gap and is generally uniformly offset from the cores, wherein the motor has a width axis that is perpendicular to the depth axis and is generally uniformly offset from the cores;
wherein the magnet:
has faces that face each of the cores;
comprises two portions that have opposite magnetic poles on the same faces of the magnet, where the portions meet at a border and are each tapered along the motor depth axis in a complementary fashion; and
has a relatively constant width along the motor width axis.

* * * * *